3,285,998
PHOSPHORUS TRICHLORIDE-TRIMETHYLOL-
ALKANE CHLORAL REACTION PRODUCTS
Millard S. Larrison, Livingston, N.J., assignor to Weston
Chemical Corporation, Newark, N.J., a corporation of
New Jersey
No Drawing. Filed Oct. 30, 1963, Ser. No. 319,940
7 Claims. (Cl. 260—920)

The present invention relates to the preparation of chloral reaction products.

It has been proposed previously in Gould patent application Serial No. 220,022, filed August 28, 1962, now Patent No. 3,179,689, to react phosphorus trichloride with an equimolar amount of trimethylolpropane, or less preferably, with trimethylolethane, to form a low molecular weight polymer. This polymer has proven quite useful as a lubricant additive. The product of the Gould application using trimethylolpropane, and phosphorus trichloride has been sold commercially as TP-2.

In preparing TP-2 the maximum chlorine content is about 17% with a phosphorus content of about 15%. A product of the TP-2 type with a chlorine content above 13 to 14% is difficult to make. Small amounts of water in either the trimethylolpropane or the phosphorus trichloride are quite detrimental to high chlorine values. On the other hand, it has been found expensive to remove the small amount of water which occurs in many commercial samples of trimethylolpropane and phosphorus trichloride.

It has further been found that a high chlorine content is conducive to maximum lubricity in lubricating systems where TP-2 has been found effective.

It is an object of the present invention to increase the lubricating effect of TP-2.

Another object is to raise the chlorine content of trimethylolalkane-phosphorus trichloride reaction products.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting chloral with the low molecular weight polymeric reaction product of a trimethylolalkane and phosphorus trichloride. For example, when trimethylolpropane is the trimethylolalkane the maximum amount of chlorine has been increased to 28% or even above, e.g., 43%.

The products of the present invention are not only useful as lubricating oil additives to control oxidative breakdown of lubricating fluids, but also can be employed to impart fire or flame resistant properties to a wide variety of materials such as cellulose acetate, polypropylene, polyethylene, etc. They are useful as plasticizers for vinyl chloride resins.

Unless otherwise indicated all parts and percentages are by weight. There can be used as little as 1 part of chloral to 10 parts of TP-2 or there can be used as much as 1 part of chloral to 1 part of TP-2. At present it is preferred to use 1 part of chloral to between 3 and 7 parts of TP-2. The reaction is exothermic. Slight heating can be employed to initiate the reaction.

The entire disclosure of the aforementioned Gould application is hereby incorporated by reference.

Example 1

To 50 grams of a commercial sample of TP-2 (low molecular weight polymer made by condensing trimethylolpropane with an equilmolar amount of phosphorus trichloride and removing the HCl formed) and having a chloride content of 14.8% there were added 15 grams of chloral at 100° C. over a 15-minute period. The temperature rose to 115° C. during the addition. The product had a chlorine content of 28%.

Example 2

210 grams of TP-2 with a chlorine content of 13.8% were heated to 180° C. and 30 grams of chloral were added during a 5 minute period. The temperature rose to 200° C. during the addition of the chloral and was then further increased by the application of external heat to 220° C. There was no loss of chloral or chlorine during the heating period. The product was slightly more viscous than the TP-2 but, otherwise, was physically indistinguishable from the starting TP-2. Both had a clear, almost water-white appearance. The polymeric product had a chlorine content of 21.3% and a phosphorus content of 13.0%. The chlorine to phosphorus ratio was 1.64 to 1.

Example 3

2615 grams of commercial TP-2 (chlorine content 14%) were heated to 60° C. and 830 grams of chloral were added with stirring. The temperature gradually rose to 165° C. during the addition of the chloral and the product became more viscous. The chlorine content of the product was 28%.

Example 4

520 grams of commercial TP-2 with a chlorine content of 13.83% were placed in a 1000 ml. flask and heated to 193° C. The heating mantle was removed and 74.5 grams of chloral were added slowly from a dropping funnel during 20 minutes. The temperature rose 203° C. during the addition of the chloral. The product weighed 74 grams plus more than the starting TP-2. There was no odor of chloral from the product. There was a very slight increase in color. The chlorine content of the product was 21%.

Example 5

There was gradually added 5.0 parts (36.4 mols) of phosphorus trichloride to 4.9 parts (36.5 mols) of trimethylolpropane at 60° to 65° C. The mixture was continuously stirred. The hydrogen chlorine evolved was collected in water. After addition of the phosphorus trichloride was completed, the viscous mixture was heated to 100° C. to facilitate removal of hydrogen chloride. The pot residue was then heated in vacuo (15 mm.) at 160° C. to help remove residual amounts of hydrogen chloride. The viscous, colorless, odorless, liquid product obtained had an $n_d^{25}$ 1.4940. The product was nonvolatile and stable at temperatures up to 160° C. and higher.

The product contained an average of 0.5 chlorine atom per trimethylolpropane unit.

Infrared analysis of the liquid product shows that the spectrum of the product includes an OH band at 3740 cm.$^{-1}$, a CH stretch at 3100 cm.$^{-1}$, a P-H band at 2500 cm.$^{-1}$, a peak at 1480 cm.$^{-1}$, an intense P=O band at 1285 cm.$^{-1}$, an intense absorption in the o-p region ranging from 975 cm.$^{-1}$ to 1080 cm.$^{-1}$, a peak at 848 cm.$^{-1}$, a peak at 798 cm.$^{-1}$, and a peak at 730 cm.$^{-1}$.

The chlorine analysis of the product is about 10%.

It appears that the major constituent of the liquid product is a non-cyclic polymeric hydrogen phosphate with pendant chloromethyl and hydroxymethyl groups.

10 parts of the low molecular weight polymeric product thus prepared were heated to 90° C. and there were added 2 parts of chloral and the reaction product recovered.

*Example 6*

50 mols of trimethylolpropane (6700 grams) were placed in a 12-liter flask equipped with a dip tube below the surface of the trimethylolpropane and a reflux condenser. The flask was heated to 69° C. and $PCl_3$ was then added gradually through the dip tube. The mixture was heated and there was a very slight reflux. The temperature rose to 105° C. over a period of 45 minutes. The temperature was maintained between 100° and 113° C. for 8 hours and 5 minutes and then was raised to 135° C. over 25 minutes.

One hour and 35 minutes after the start of the addition of the $PCl_3$ 1500 grams had been added, and 1 hour later a total of 3000 grams of $PCl_3$ had been added. Six hours after the initial addition of $PCl_3$ a total of 4545 grams had been added and an hour and 20 minutes later a total of 5500 grams of $PCl_3$ had been added. The final $PCl_3$ was added 8 hours and 50 minutes after the beginning of such addition. In all 6910 grams of $PCl_3$ (slightly over 50 mols) were added.

The HCl which formed was removed as a gas through the reflux condenser and was weighed. Three hours and 25 minutes after the beginning of the reaction 950 grams of HCl had been collected, this was increased to 1600 grams 1 hour later and to 2360 grams after a further 1 hour and 35 minutes. Following an additional reaction period of 1 hour and 20 minutes 2850 grams total of HCl had been collected and after a further 1 hour and 30 minutes a total of 3880 grams had been collected. After the heating to 135° C. (i.e., 9 hours and 15 minutes from the start of the reaction) 3950 grams total (108.2 mols, based on the $PCl_3$ used, 65% of theory) hydrogen chloride was uncovered.

At the end of this time the batch was vacuum stripped to 165° C. at 10 mm. to remove a distillate in an amount of 30 grams, $n_d^{50}$ 1.4770. The residue in a yield of 9455 grams was the desired phosphorus and chlorine containing organic substance which had an infrared spectrum and an $n_d^{50}$ 1.4878.

10 parts of the low molecular weight polymeric product thus prepared were heated to 100° C. and 1.4 parts of chloral were added and the reaction product recovered.

While the reaction product of trimethylolpropane and phosphorous trichloride was employed in the specific examples, and this is the preferred form of the invention, there can also be used trimethylolethane or trimethylolbutane reaction products with phosphorus trichloride as the starting material.

What is claimed is:

1. The organic reaction product of chloral with the phosphorus and chlorine containing organic polymer obtained by condensing phosphorus trichloride with a trimethylol alkane.

2. The organic reaction product of chloral with the phosphorus and chlorine containing organic polymer obtained by condensing phosphorus trichloride with a substantially equimolar amount of a trimethylol lower alkane.

3. The organic reaction product of chloral with the phosphorus and chlorine containing organic polymer obtained by condensing phosphorus trichloride with trimethylolpropane.

4. The organic reaction product of chloral with the phosphorus and chlorine containing organic polymer obtained by condensing phosphorus trichloride with a substantially equimolar amount of trimethylolpropane.

5. A product according to claim 4 wherein there are employed from 1 to 10 parts of the organic polymer per part of chloral.

6. A product according to claim 4 wherein there are employed from 3 to 7 parts of the organic polymer per part of chloral.

7. A product according to claim 4 having a chlorine content of 21 to 28%.

No references cited.

CHARLES B. PARKER, *Primary Examiner.*

FRANK M. SIKORA, *Assistant Examiner.*